US010173730B2

(12) United States Patent
Hirota

(10) Patent No.: US 10,173,730 B2
(45) Date of Patent: Jan. 8, 2019

(54) VEHICLE FRONT STRUCTURE

(71) Applicant: TOYOTA JIDOSHA KABUSHIKI KAISHA, Toyota-shi (JP)

(72) Inventor: Akihiro Hirota, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 323 days.

(21) Appl. No.: 15/103,235

(22) PCT Filed: Dec. 9, 2014

(86) PCT No.: PCT/IB2014/002696
§ 371 (c)(1),
(2) Date: Jun. 9, 2016

(87) PCT Pub. No.: WO2015/087131
PCT Pub. Date: Jun. 18, 2015

(65) Prior Publication Data
US 2018/0162452 A1     Jun. 14, 2018

(30) Foreign Application Priority Data

Dec. 12, 2013   (JP) ................................ 2013-257114

(51) Int. Cl.
*B60R 19/18*     (2006.01)
*B62D 25/08*     (2006.01)
(Continued)

(52) U.S. Cl.
CPC ............ *B62D 25/085* (2013.01); *B60R 19/18* (2013.01); *B60R 19/36* (2013.01); *B62D 21/02* (2013.01);
(Continued)

(58) Field of Classification Search
CPC .... B62D 25/085; B62D 21/152; B62D 21/02; B60R 19/36; B60R 19/18; B60R 2019/1806; B60R 2019/247
(Continued)

(56) References Cited

U.S. PATENT DOCUMENTS 7,341,299 B1    3/2008   Baccouche et al.
8,876,194 B2 *  11/2014  Dix ..................... B62D 25/088
                                                    296/187.09
(Continued)

FOREIGN PATENT DOCUMENTS

JP    2007-196888 A    8/2007
JP    5144702 B2       2/2013
JP    2013-193571 A    9/2013

OTHER PUBLICATIONS

International Search Report dated Apr. 10, 2015, in PCT/IB2014/002696 filed Dec. 9, 2014.

*Primary Examiner* — Pinel E Romain
(74) *Attorney, Agent, or Firm* — Oblon, McClelland, Maier & Neustadt, L.L.P.

(57) ABSTRACT

An outrigger is connected to a front end part of an apron upper member, and further, is extended from its connected part up to that area of a front side member which is on its front end side and on its outer side in a vehicle width direction so as to be connected to the front side member. One end part of a connecting support member is connected to a connecting portion between the outrigger and the apron upper member. The connecting support member extends inward in the vehicle width direction in a plan view of a vehicle from its connected part, so as to be connected to the front side member.

6 Claims, 5 Drawing Sheets

(51) Int. Cl.
  *B60R 19/36* (2006.01)
  *B62D 21/02* (2006.01)
  *B62D 21/15* (2006.01)
  *B60R 19/24* (2006.01)

(52) U.S. Cl.
  CPC ......... *B62D 21/152* (2013.01); *B62D 25/082* (2013.01); *B60R 2019/1806* (2013.01); *B60R 2019/247* (2013.01)

(58) Field of Classification Search
  USPC ........................................ 296/203.02, 181.2
  See application file for complete search history.

(56) References Cited

U.S. PATENT DOCUMENTS

| | | | |
|---|---|---|---|
| 9,108,680 B2* | 8/2015 | Suzuki | B62D 25/082 |
| 9,327,665 B2* | 5/2016 | Barbat | B60R 19/34 |
| 9,650,073 B2* | 5/2017 | Kim | B62D 25/082 |
| 2013/0241233 A1 | 9/2013 | Ohnaka et al. | |
| 2016/0236718 A1* | 8/2016 | Tatsuwaki | B62D 21/155 |
| 2017/0274849 A1* | 9/2017 | Jordan | B60R 19/34 |

\* cited by examiner

VEHICLE FRONT STRUCTURE

BACKGROUND OF THE INVENTION

1. Field of the Invention

The present invention relates to a vehicle front structure.

2. Description of Related Art

As for a vehicle front portion, there has been known a structure in which an apron upper member is extended to a lateral side of a front end part of a front side member, and a front end of the front side member is connected to a front end of the apron upper member via a connecting plate (see, for example, Japanese Patent No. 5144702).

However, in such a structure, when a front side of the apron upper member is bent inward in a vehicle width direction at the time of an oblique collision in which a collision load is input from a diagonally front side of a vehicle, load transferability decreases. In view of this, there is room for improvement in that a load is transmitted stably in an oblique collision.

SUMMARY OF THE INVENTION

The present invention provides a vehicle front structure that is able to transmit a load stably in an oblique collision.

A vehicle front structure according to a first aspect of the present invention includes: a front side member provided on an outer side of a vehicle-body front portion in a vehicle width direction, the front side member being placed along a vehicle front-rear direction; an apron upper member provided outside the front side member in the vehicle width direction and above the front side member in a vehicle up and down direction, the apron upper member being placed along the vehicle front-rear direction; a first connecting member connected to a front end part of the apron upper member, the first connecting member extending from a connecting portion between the first connecting member and the front end part of the apron upper member, up to that area of the front side member, the area of the front side member being on front end side of the front side member and the area of the front side member being on outer side of the front side member in the vehicle width direction, the first connecting member being connected to the front side member directly or via a member; and a second connecting member connected, directly or via a member, to an area between a rear part of the first connecting member and the front part of the apron upper member, the second connecting member extending from a connecting portion of the second connecting member to inward in the vehicle width direction in a plan view of a vehicle, the second connecting member being connected to the front side member.

According to the above configuration, the first connecting member is connected to the front end part of the apron upper member, and extends from the connecting portion between the first connecting member and the front end part of the apron upper member, up to that area of the front side member the area of the front side member being on the front end side of the front side member and the area of the front side member being on the outer side of the front side member in the vehicle width direction, the first connecting member being connected, directly or via a member, to the front side member. In view of this, at the time when a part outside the front side member in the vehicle width direction has a front end collision with a collision object, for example, a collision load is input into a front end part of the first connecting member.

Here, in the above aspect, the second connecting member is connected, directly or via a member, to the area between the rear part of the first connecting member and the front part of the apron upper member, and the second connecting member extends from the connecting portion to inward in the vehicle width direction in the plan view of the vehicle, the second connecting member being connected to the front side member. In view of this, when the part outside the front side member in the vehicle width direction has an oblique collision with a collision object and a lateral force directed inward in the vehicle width direction is applied to the vehicle-body front portion, the second connecting member resists the lateral force in the vehicle width direction, in the plan view of the vehicle, so as to generate a reaction force. Hereby, inward displacement, in the vehicle width direction, of the front side of the apron upper member is restrained. Accordingly, a collision load is effectively transmitted to the apron upper member, and the collision load is also transmitted to the front side member via the second connecting member.

The vehicle front structure may be configured such that the second connecting member is connected, directly or via a member, to the connecting portion between the first connecting member and the apron upper member.

According to the above configuration, since the second connecting member is connected, directly or via a member, to the connecting portion between the first connecting member and the apron upper member, the connecting portion is reinforced. In view of this, when the part outside the front side member in the vehicle width direction has an oblique collision with a collision object, for example, a collision load is dispersed more stably and transmitted.

The vehicle front structure may be configured such that the second connecting member is inclined downward in the vehicle up and down direction, the second connecting member extending inward in the vehicle width direction.

In the above configuration, the second connecting member is not horizontal, but inclined downward in the vehicle up and down direction the second connecting member extending inward in the vehicle width direction. Accordingly, when the part outside the front side member in the vehicle width direction has an oblique collision with a collision object, a collision load is transmitted to an apron-upper-member side more effectively.

The vehicle front structure may be configured such that a vertical member is provided, the vertical member being connected to the area between the rear part of the first connecting member and the front part of the apron upper member, the vertical member extending from the area between the rear part of the first connecting member and the front part of the apron upper member; and the second connecting member is connected to a lower end part of the vertical member, the second connecting member extending horizontally to be directed inward in the vehicle width direction, the second connecting member being connected to an outer surface of the front side member in the vehicle width direction.

According to the above configuration, the vertical member connected to the area between the rear part of the first connecting member and the front part of the apron upper member, the vertical member extending form the area between the rear part of the first connecting member and the front part of the apron upper member, and the second connecting member is connected to the lower end part of the vertical member, and extends horizontally to be directed inward in the vehicle width direction, so as to be connected to the outer surface of the front side member in the vehicle width direction. In view of this, at the time when the part outside the front side member in the vehicle width direction has an oblique collision with a collision object, for example, a load is input from the vertical member to the second connecting member placed horizontally, so that a collision load is transmitted to a front-side-member side effectively.

The vehicle front structure of the present invention may be configured such that: a gusset is placed on the front end side of the front side member and on the outer side of the front side member in the vehicle width direction; and the gusset is connected to the front side member and the first connecting member.

According to the above configuration, since the gusset is placed on the front end side of the front side member and on the outer side thereof in the vehicle width direction so as to be connected to the front side member and the first connecting member, when the part outside the front side member in the vehicle width direction has an oblique collision with a collision object, for example, a load applied to the front end side of the first connecting member is partially transmitted to the front side member more stably.

The vehicle front structure may be configured such that a connecting portion between the front side member and the second connecting member is placed on a vehicle rear side relative to a connecting portion between the front side member and the gusset, the connecting portion between the front side member and the second connecting member being separated from the connecting portion between the front side member and the gusset.

According to the above configuration, since the connecting portion between the front side member and the second connecting member is placed on the vehicle rear side relative to the connecting portion between the front side member and the gusset, the connecting portion between the front side member and the second connecting member being separated from the connecting portion between the front side member and the gusset, a rigidity difference is set between the connecting portion between the front side member and the gusset, and its adjacent rear part. In view of this, at the time of a small overlap collision in which the part outside the front side member in the vehicle width direction has a front end collision with a collision object, for example, the front side member can be deformed in a bending manner with an area where the rigidity difference is set being taken as a starting point.

As described above, the vehicle front structure of the present invention yields such an excellent effect that a load can be stably transmitted in an oblique collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
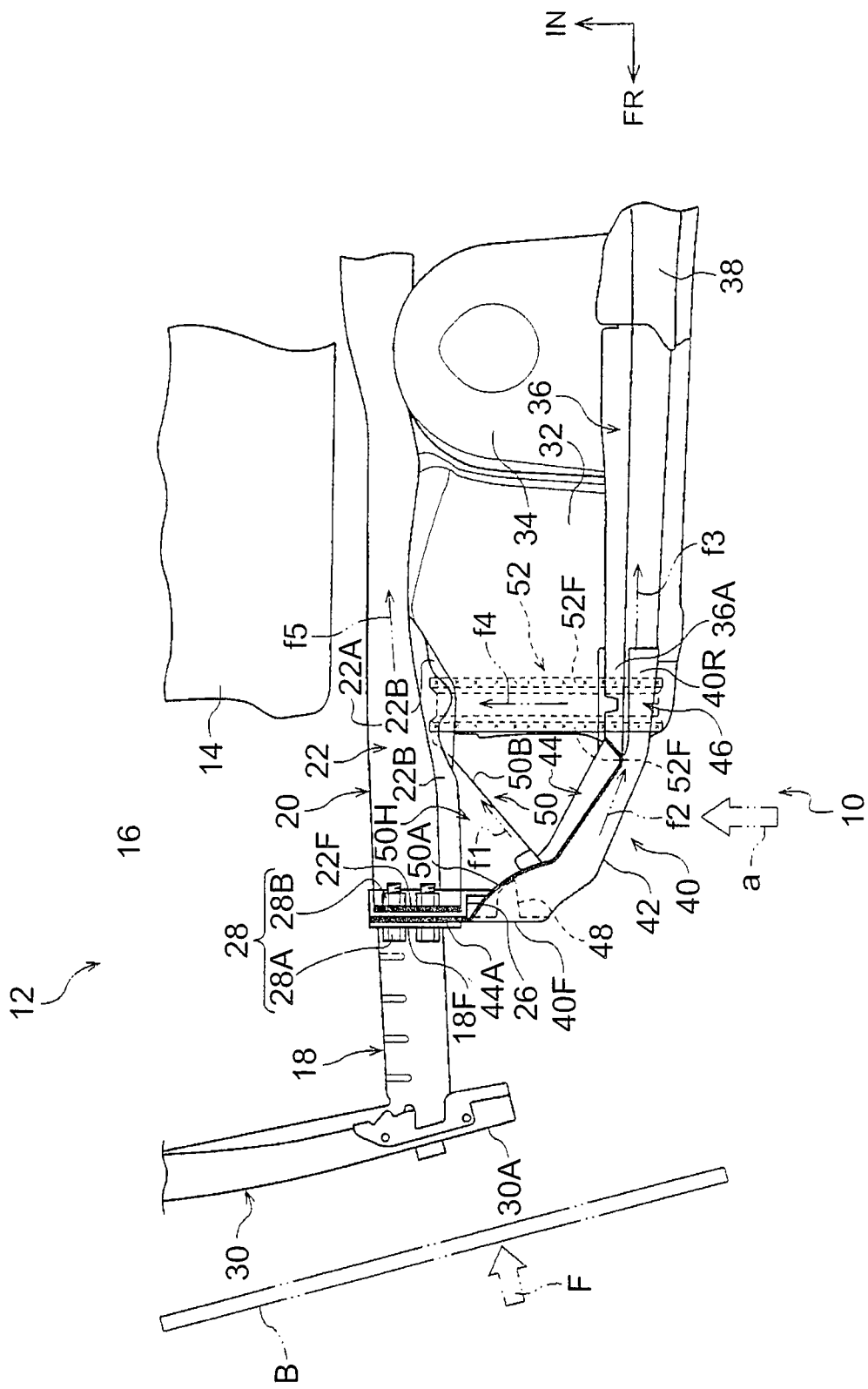
FIG. 1 is a plan view illustrating a vehicle front structure according to a first embodiment of the present invention.
Figure 2:
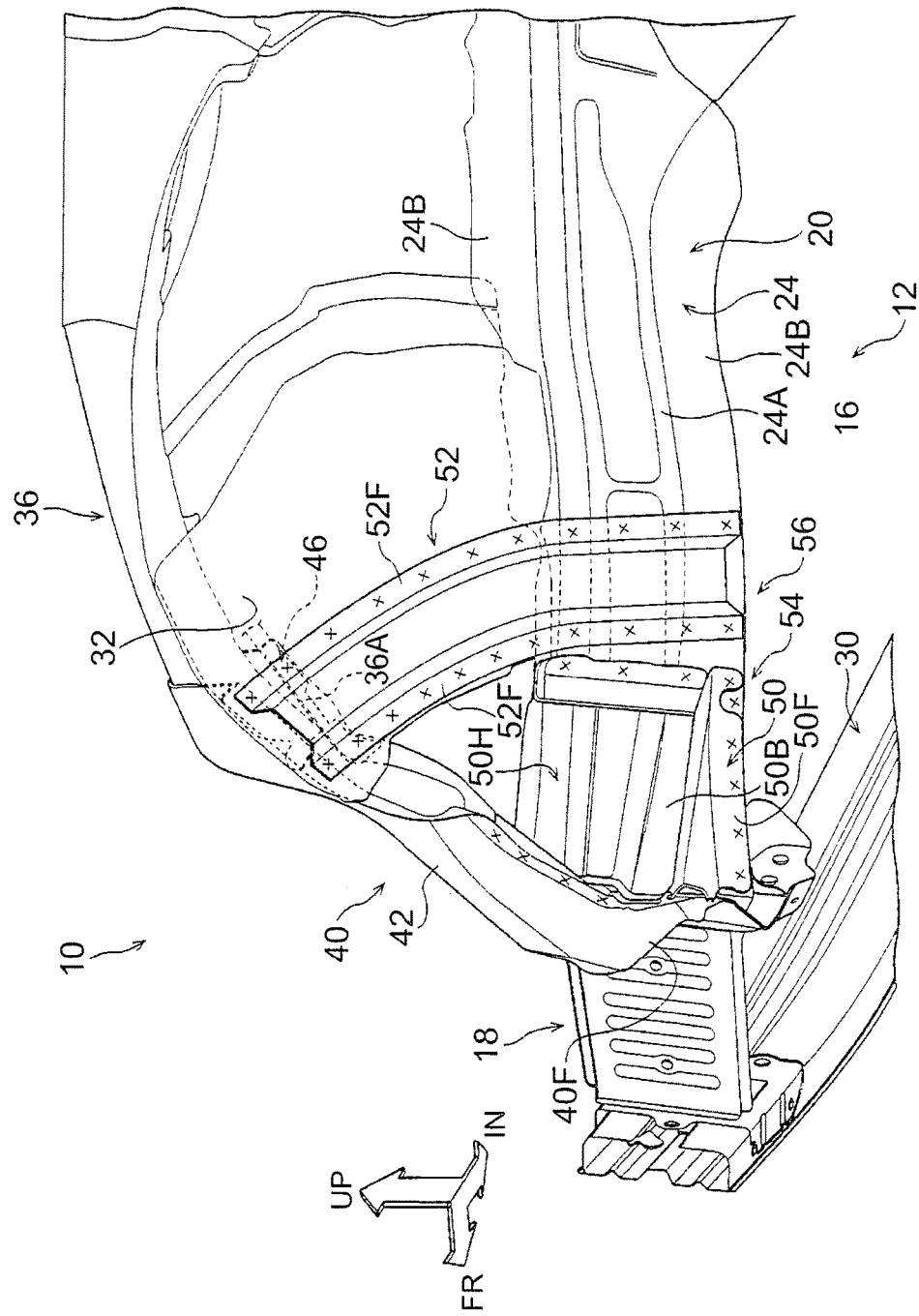
FIG. 2 is a perspective view illustrating the vehicle front structure according to the first embodiment of the present invention, when viewed from outside in a vehicle width direction and a diagonally lower side of a vehicle.
Figure 3:
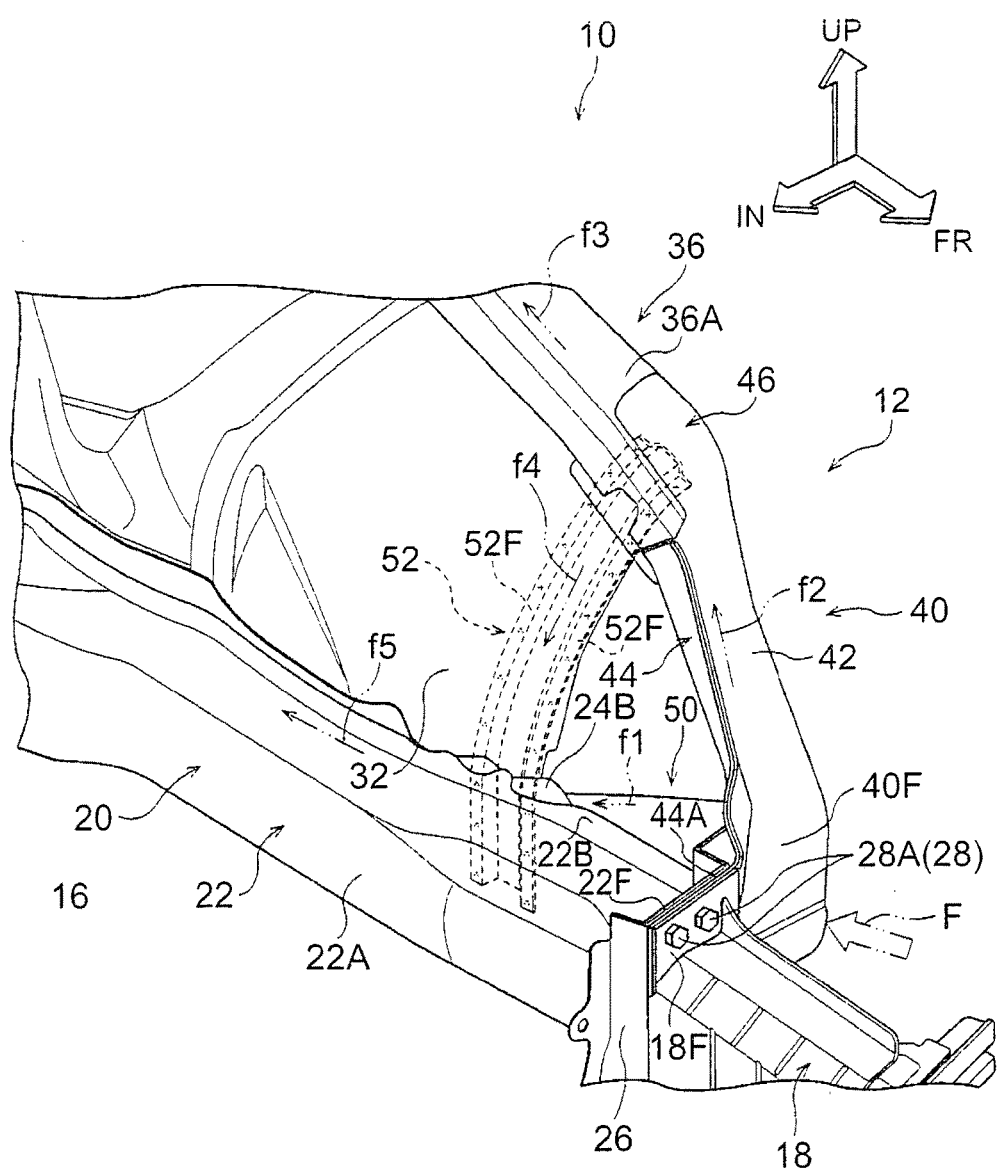
FIG. 3 is a perspective view illustrating the vehicle front structure according to the first embodiment of the present invention, when viewed from inside in the vehicle width direction and a diagonally upper side of the vehicle.

The following describes a vehicle front structure 10 according to a first embodiment of the present invention with reference to FIGS. 1 to 3. Note that an arrow FR shown appropriately in each figure indicates forward in a vehicle front-rear direction, an arrow UP indicates upward in a vehicle up and down direction, and an arrow IN indicates inward in a vehicle width direction. Hereinafter, in a case where a description is made by use of merely front and rear directions, up and down directions, and right and left directions, they indicate forward and rearward in the vehicle front-rear direction, upward and downward in the vehicle up-down direction, and right and left in a vehicle right-left direction, respectively, unless otherwise specified.

FIG. 1 is a plan view of a vehicle front structure 10 according to the present embodiment. Further, FIG. 2 is a perspective view illustrating the vehicle front structure 10 when viewed from outside in the vehicle width direction and from a diagonally lower side of a vehicle, and FIG. 3 is a perspective view illustrating the vehicle front structure 10 when viewed from inside in the vehicle width direction and from a diagonally upper side of the vehicle. Note that FIGS. 1 to 3 illustrate a left side of a vehicle-body front portion 12.

In an automobile (a vehicle) to which the vehicle front structure 10 illustrated in FIG. 1 is applied, an engine compartment 16 is formed in the vehicle-body front portion 12 provided on a vehicle front side relative to a cabin (a passenger compartment; not shown). In the engine compartment 16, a power unit 14 constituted by an engine, a motor, and the like is accommodated. Paired right and left front side members 20 are provided at respective sides, in the vehicle width direction, of a lower part of the engine compartment 16.

The front side member 20 is provided on an outer side of the vehicle-body front portion 12 in the vehicle width direction, the front side member 20 being placed along the vehicle front-rear direction, and is constituted by a front side member inner 22 and a front side member outer 24 (see FIG. 2). The front side member inner 22 illustrated in FIG. 3 includes: a body portion 22A having a generally U-shaped sectional shape that is opened outwardly in the vehicle width direction, when being taken along a plane perpendicular to a longitudinal direction of the front side member 20; and upper and lower flanges 22B (only the upper flange is illustrated in FIG. 3). In the meantime, the front side member outer 24 illustrated in FIG. 2 includes a body portion 24A formed in a generally flat-plate shape, and upper and lower flanges 24B, and closes an open side of the front side member inner 22 (see FIG. 3). That is, the front side member 20 is formed in a closed-section structure such that the upper and lower flanges 22B, 24B of the front side member inner 22 and the front side member outer 24 (see FIG. 2) as illustrated in FIG. 3 are connected to each other by spot welding or the like. Right and left front side members 20 support the power unit 14 illustrated in FIG. 1 via engine mounts (not shown).

Further, a front flange 22F bent upward in the vehicle up and down direction and downward in the vehicle up and down direction is formed in a front end part of the front side member inner 22. A plate-shaped bracket 26 is connected in a fastening manner to the front flange 22F with a fastener 28 constituted by bolts 28A and weld nuts 28B.

A crash box 18 is placed on a vehicle front side of the front side member 20. The crash box 18 is formed to have a rectangular closed section when viewed in a front view of the vehicle, and is set to have a lower rigidity (offset yield strength) with respect to an axial compression load along the vehicle front-rear direction, than that of the front side member 20. A flange 18F is formed in a rear end of the crash box 18. The flange 18F is co-fastened to the bracket 26 and the front flange 22F of the front side member inner 22 with the fastener 28. A bumper reinforcement 30 is fixed to a front end part of the crash box 18 by means of bolt fastening or the like.

The bumper reinforcement 30 is placed in the vehicle-body front portion 12 with the vehicle width direction as its longitudinal direction, and has a bumper extending portion 30A extended outwardly in the vehicle width direction relative to the crash box 18. Note that a front bumper is formed such that an absorber (a cushioning; not shown) made of a foam material or the like is attached to a front end face of the bumper reinforcement 30, and the absorber and the bumper reinforcement 30 are covered with a bumper cover (not shown).

A suspension tower 34 is provided outside a rear side of the front side member 20 in the vehicle width direction and above the rear side of the front side member in the vehicle up and down direction. A lower end part of the suspension tower 34 is connected to the front side member 20. The suspension tower 34 supports an upper part of a suspension device (not shown), and a suspension arm provided in the suspension device is supported by a suspension member (not shown) attached to a bottom face of the front side member 20.

Further, an end of the suspension tower 34 on its upper end side and on its outer side in the vehicle width direction is connected to an apron upper member 36. The apron upper member 36 is placed, along the vehicle front-rear direction, outside the front side member 20 in the vehicle width direction and above the front side member 20 in the vehicle up and down direction. A front end position of the apron upper member 36 is set to a position on the vehicle rear side relative to a front end position of the front side member 20. The apron upper member 36 has a closed-section structure extending in the vehicle front-rear direction, by joining a plurality of plate materials to each other. A rear end part of the apron upper member 36 is connected to a cowl top side 38.

An end part of the suspension tower 34 on its vehicle front side is connected to an end part of an apron front 32 on its vehicle rear side. The apron front 32 is disposed between the apron upper member 36 and the front side member 20. An outer end of the apron front 32 in the vehicle width direction is connected to an inner end of the apron upper member 36 in the vehicle width direction, and an inner end of the apron front 32 in the vehicle width direction is connected to the upper flanges 22B, 24B of the front side member 20.

As illustrated in FIGS. 1 to 3, a front end part 36A of the apron upper member 36 is connected to a front end part of the front side member 20 via an outrigger (also referred to as "apron brace") 40 as a first connecting member. That is, the outrigger 40 is connected to the front end part 36A of the apron upper member 36, and further, the outrigger 40 is extended from its connected part up to that area of the front side member 20 which is on its front end side and on its outer side in the vehicle width direction so as to be connected to the front side member 20 with the bracket 26 (see FIG. 3) sandwiched therebetween. The outrigger 40 is made of metal as an example, and is extended from the front end part 36A of the apron upper member 36 downward in the vehicle up and down direction and inward in the vehicle width direction, the outrigger 40 extending toward the vehicle front side.

As illustrated in FIG. 1, the outrigger 40 is configured such that an outer panel 42 is connected to an inner panel 44. The outer panel 42 has a hat-shaped section including upper and lower flanges projecting generally forward in the vehicle front-rear direction or outward in the vehicle width direction in a front part 40F of the outrigger 40 and an intermediate part thereof in the front-rear direction. Further, the outer panel 42 has a hat-shaped section including flanges on both sides thereof in the vehicle width direction so as to project generally upward in the vehicle up and down direction in a rear part 40R of the outrigger 40. In the meantime, the inner panel 44 includes flanges closing an open side of the outer panel 42 except a rear end part of the outer panel 42 and connected to the flanges of the outer panel 42 in a fitting manner. That is, the outrigger 40 is formed in a closed-section structure such that respective flanges of the outer panel 42 and the inner panel 44 are connected to each other by spot welding.

Further, part of the rear part 40R of the outrigger 40 is cut out from the vehicle rear side. An outer part, in the vehicle width direction, of the front end part 36A of the apron upper member 36 is placed on a bottom side of the rear part 40R of the outrigger 40 and is connected to the rear part 40R of the outrigger 40 by welding, and an inner part, in the vehicle width direction, of the front end part 36A of the apron upper member 36 is placed on a top side of the rear part 40R of the outrigger 40 and is connected to the rear part 40R of the outrigger 40 by welding.

As illustrated in FIG. 2, that end of the apron front 32 which is on its front end side and on its outer side in the vehicle width direction is connected to a bottom side of a rear end part of the outrigger 40. Further, part of the front end part 36A of the apron upper member 36 is inserted between the rear end part of the outrigger 40 and the apron front 32, so that the front end part 36A of the apron upper member 36 is connected to the outrigger 40 and the apron front 32.

As illustrated in FIG. 3, a flat-plate fixed portion 44A projecting inward in the vehicle width direction is formed in a front end part of the inner panel 44 of the outrigger 40. Note that, instead of the fixed portion 44A, a flat-plate fixed portion projecting inward in the vehicle width direction may be formed in a front end part of the outer panel 42 of the outrigger 40. The fixed portion 44A is sandwiched between the bracket 26 and the flange 18F of the crash box 18. The fixed portion 44A is co-fastened, with the fastener 28, to the front flange 22F of the front side member inner 22, the bracket 26, and the flange 18F of the crash box 18 so as to be connected thereto in a fastening manner. Thus, respective front ends of the outrigger 40 and the front side member 20 are connected to each other. Accordingly, when a collision load is input into the outrigger 40, part of the load can be stably transmitted to the front side member 20.

As illustrated in FIG. 1, within a section of the front part 40F of the outrigger 40, a bulk head 48 is placed. The bulk head 48 is formed in a hat shape that is opened forward in the vehicle front-rear direction in a plan view of the vehicle. A flange of the bulk head 48 on its vehicle front side is fixed to the outer panel 42 of the outrigger 40, and a longitudinal wall portion of the bulk head 48 on its vehicle rear side is fixed to the inner panel 44 of the outrigger 40.

In the meantime, on the vehicle rear side of the front part 40F of the outrigger 40, a gusset 50 is placed on the front end side of the front side member 20 and on the outer side of the front side member 20 in the vehicle width direction. The gusset 50 is made of metal as an example, and includes a body portion 50H formed generally in a hollow and generally triangular pole shape such that a plurality of plate materials is connected to each other, so that the gusset 50 projects outward in the vehicle width direction.

As illustrated in FIG. 2, the gusset 50 is configured such that upper and lower flanges 50F (only the lower flange is illustrated in FIG. 2) projecting from an inner end, in the vehicle width direction, of the body portion 50H generally in the triangular pole are connected, by welding, to the upper and lower flanges 22B, 24B (see FIG. 3) of the front side member inner 22 (see FIG. 3) and the front side member outer 24. Further, as illustrated in FIG. 1, the front wall portion 50A of the gusset 50 is placed on a rear side of the front part 40F of the outrigger 40, and is connected to the inner panel 44 of the outrigger 40 and the bulk head 48. Further, an outer wall portion 50B on an outer side of the gusset 50 in the vehicle width direction is an inclined wall portion inclined inward in the vehicle width direction toward the vehicle rear side, and a rear end part thereof extends to the front side member outer 24 (see FIG. 2).

As illustrated in FIG. 2, a front end of a connecting portion 46 between the outrigger 40 and the apron upper member 36 is placed generally at the same position in the vehicle front-rear direction as a rear end of a connecting portion 54 between the front side member 20 and the gusset 50. Further, one end of a connecting support member 52 as a second connecting member is connected to the connecting portion 46 between the outrigger 40 and the apron upper member 36, and the connecting support member 52 is extended inward in the vehicle width direction from its connected part in a plan view of the vehicle, so as to be connected to the front side member 20. Note that the connecting portion 46 between the outrigger 40 and the apron upper member 36 corresponds to an area between a rear part of the outrigger 40 and a front part of the apron upper member 36 in a wide sense.

As illustrated in FIG. 3, the connecting support member 52 for connecting the connecting portion 46 between the outrigger 40 and the apron upper member 36 to the front side member 20 is inclined downward in the vehicle up and down direction to be directed inward in the vehicle width direction. A sectional shape of the connecting support member 52 when being taken along a plane perpendicular to a longitudinal direction thereof is formed in a hat-like shape opened upward in the vehicle up and down direction or inward in the vehicle width direction. As illustrated in FIG. 2, outer ends, in the vehicle width direction, of paired front and rear flanges 52F of the connecting support member 52 are connected, by welding (spot welding in the present embodiment), to the connecting portion 46 between the outrigger 40 and the apron upper member 36 via the apron front 32. Further, intermediate parts, in the vehicle width direction, of the paired front and rear flanges 52F of the connecting support member 52 are connected to a vehicle front side end part of the apron front 32 by welding (spot welding in the present embodiment). Further, inner ends, in the vehicle width direction, of the paired front and rear flanges 52F of the connecting support member 52 are connected to the front side member outer 24 by welding (spot welding in the present embodiment). The connecting portion 56 between the front side member 20 and the connecting support member 52 is placed on the vehicle rear side relative to the connecting portion 54 between the front side member 20 and the gusset 50 the connecting portion 54 between the front side member 20 and the connecting support member 52 being separated from the connecting portion 54 between the front side member 20 and the gusset 50.

Operations/Effects

Operations and effects of the above embodiment are described below.

In the present embodiment, when a part outside the front side member 20 in the vehicle width direction as illustrated in FIG. 1 has a front end collision (e.g., a small overlap collision or an oblique collision) with a barrier B, which is a collision object, a collision load F is input into the front part 40F of the outrigger 40.

Here, in the present embodiment, the connecting support member 52 is connected to the area between the rear part of the outrigger 40 and the front part of the apron upper member 36, and the connecting support member 52 extends from the connecting portion of the connecting support member 52 to inward in the vehicle width direction in a plan view of the vehicle, the connecting support member 52 being connected to the front side member 20. In view of this, when the part outside the front side member 20 in the vehicle width direction has an oblique collision with the barrier B and a lateral force a directed inward in the vehicle width direction is applied to the vehicle-body front portion 12, the connecting support member 52 resists the lateral force a in the vehicle width direction, in the plan view of the vehicle, so as to generate a reaction force. Hereby, inward displacement (inward inclination), in the vehicle width direction, of the front side of the apron upper member 36 is restrained. Accordingly, a collision load is effectively transmitted to the apron upper member 36 (see arrows f2, f3), and the collision load is also transmitted to the front side member 20 via the connecting support member 52 (see arrows f4, f5).

Further, in the present embodiment, one end side of the connecting support member 52 is connected to the connecting portion 46 between the outrigger 40 and the apron upper member 36 within the area between the rear part of the outrigger 40 and the front part of the apron upper member 36 as illustrated in FIG. 2, so that the connecting portion 46 is reinforced. In view of this, when the part outside the front side member 20 in the vehicle width direction has an oblique collision with the barrier B (see FIG. 1), a collision load is dispersed more stably and transmitted.

Further, in the present embodiment, the connecting support member 52 is not horizontal, but is inclined downward in the vehicle up and down direction so as to be directed inward in the vehicle width direction as illustrated in FIG. 3. In view of this, when the part outside the front side member 20 in the vehicle width direction has an oblique collision with the barrier B (see FIG. 1), a collision load F is transmitted to an apron-upper-member-36 side more effectively.

Further, in the present embodiment, the gusset 50 is placed on the front end side of the front side member 20 and on the outer side thereof in the vehicle width direction so as to be connected to the front side member 20 and the outrigger 40. In view of this, when the part outside the front side member 20 in the vehicle width direction has an oblique collision with the barrier B (see FIG. 1), a collision load F applied to a front-part-40F side of the outrigger 40 is partially transmitted to the front side member 20 more stably (see an arrow f1). Further, a space formed by the gusset 50, the outrigger 40, and the connecting support member 52 has a generally triangular shape or a trapezoidal shape (more strictly, a generally trapezoidal shape) with an outrigger-40 side being taken as a long side (a base) in the plan view of the vehicle, so that a load in the collision can be transmitted to a front-side-member-20 side efficiently.

As described above, according to the vehicle front structure 10 of the present embodiment, it is possible to transmit a load stably in an oblique collision.

Further, in the present embodiment, as illustrated in FIG. 2, the connecting portion 56 between the front side member 20 and the connecting support member 52 is placed on the vehicle rear side relative to the connecting portion 54 between the front side member 20 and the gusset 50, the connecting portion 54 between the front side member 20 and the connecting support member 52 being separated from the connecting portion 54 between the front side member 20 and the gusset 50. Accordingly, a rigidity difference is set between the connecting portion 54 between the front side member 20 and the gusset 50, and its adjacent rear part. In view of this, at the time of a small overlap collision in which the part outside the front side member 20 in the vehicle width direction has a front end collision with the barrier B (see FIG. 1), the front side member 20 can be deformed in a bending manner with an area where the rigidity difference is set being taken as a starting point.

Second Embodiment

Figure 4:
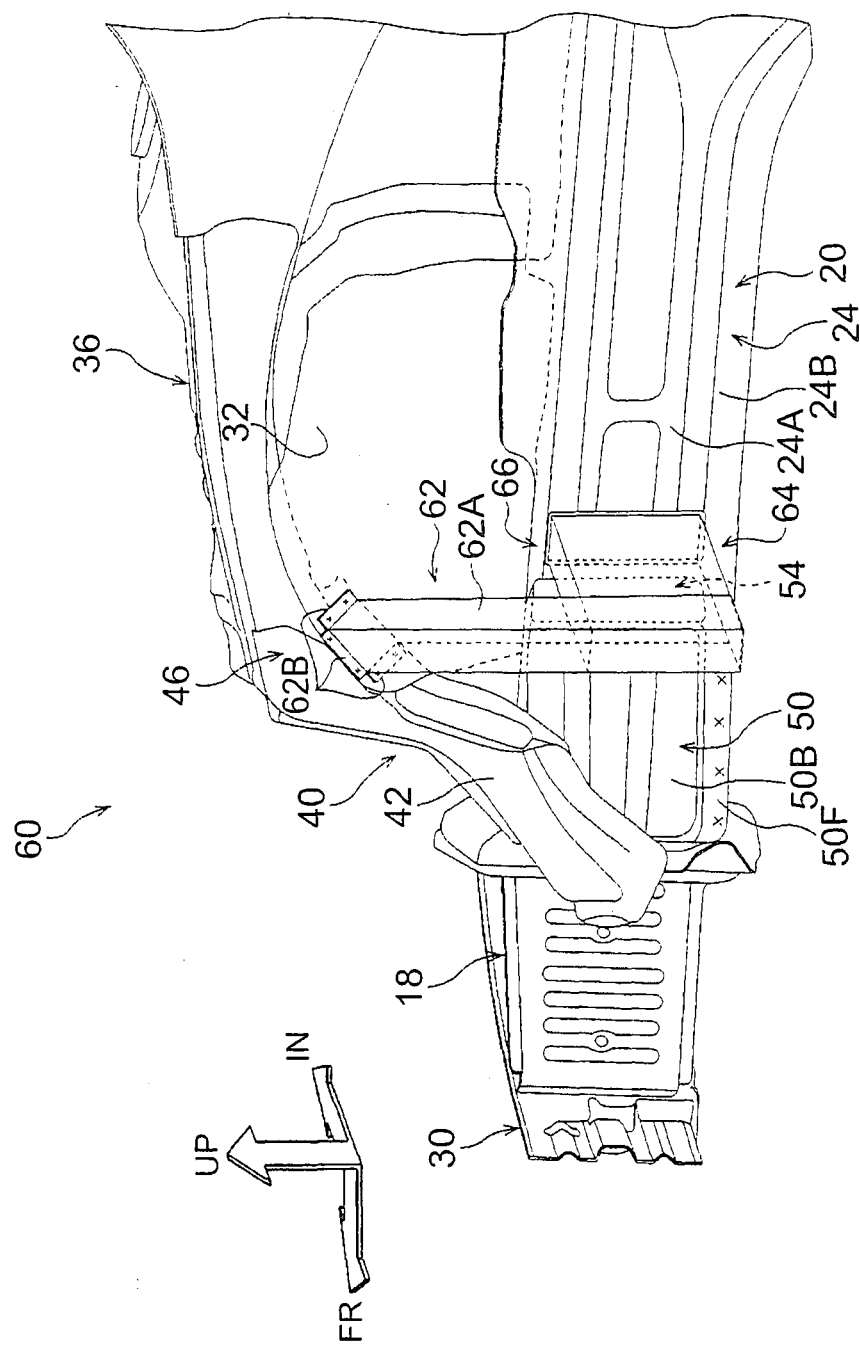
FIG. 4 is a perspective view illustrating a vehicle front structure according to a second embodiment of the present invention, when viewed from outside in the vehicle width direction and a diagonally rear side of a vehicle.

Next will be described a vehicle front structure 60 according to a second embodiment of the present invention with reference to FIG. 4. FIG. 4 is a perspective view illustrating the vehicle front structure 60 according to the present embodiment when viewed from outside in the vehicle width direction and from a diagonally rear side of a vehicle. As illustrated in the figure, the vehicle front structure 60 according to the present embodiment is different from the vehicle front structure 10 (see FIGS. 1 to 3) according to the first embodiment in that the vehicle front structure 60 includes a vertical member 62 and a connecting support member 64 as the second connecting member, instead of the connecting support member 52 (see FIGS. 1 to 3). The other configuration is generally the same as in the first embodiment. Accordingly, a constituent substantially the same as that of the first embodiment has the same reference sign as that of the first embodiment, and a description thereof is omitted.

As illustrated in FIG. 4, the vertical member 62 is connected to a bottom face of a connecting portion 46 between an outrigger 40 and an apron upper member 36, the vertical member 62 extends from the bottom face of a connecting portion 46 between an outrigger 40 and an apron upper member 3. The vertical member 62 is made of metal, and includes a body portion 62A placed with the vehicle up and down direction as its longitudinal direction. The body portion 62A is formed to have a generally U-shaped section that is opened inward in the vehicle width direction inside when viewed from above in the vehicle up and down direction, and a lower end part of the body portion 62A is set in a position at a height equivalent to that of a front side member 20. Further, the vertical member 62 includes a flange 62B projecting from an upper end part of the body portion 62A toward outside an open section. The flange 62B of the vertical member 62 is connected, by welding (spot welding in the present embodiment), to the connecting portion 46 between the outrigger 40 and the apron upper member 36 via a bottom face of an apron front 32.

One end side of the connecting support member 64 having an elongated box shape is inserted inside an open section of the lower end part of the body portion 62A of the vertical member 62 so as to make contact therewith. Note that the connecting support member 64 may be a member having a rectangular column shape or a squarely cylindrical shape, or may be a columnar member. The connecting support member 64 is made of metal, and an edge line portion on the one end side of the connecting support member 64 is connected to an inner side surface of the lower end part of the body portion 62A of the vertical member 62 by welding (arc welding in the present embodiment). The connecting support member 64 extends horizontally to be directed inward in the vehicle width direction and abuts with an outer surface, in the vehicle width direction, of a front side member outer 24 in the front side member 20, so as to be connected thereto. An inner terminal portion, in the vehicle width direction, of the connecting support member 64 is connected to an outer surface, in the vehicle width direction, of the front side member outer 24 by welding (arc welding in the present embodiment).

Further, a connecting portion 66 between the front side member 20 and the connecting support member 64 is placed on the vehicle rear side relative to a connecting portion 54 between the front side member 20 and a gusset 50 so as to be separated therefrom.

Even with the present embodiment, it is possible to transmit a load stably in an oblique collision. Further, in the present embodiment, when a part outside the front side member 20 in the vehicle width direction has an oblique collision with a barrier B (see FIG. 1), a load is input, from the vertical member 62 to the connecting support member 64 placed horizontally, so that a collision load is transmitted to a front-side-member-20 side effectively.

Modification of Second Embodiment

Figure 5:
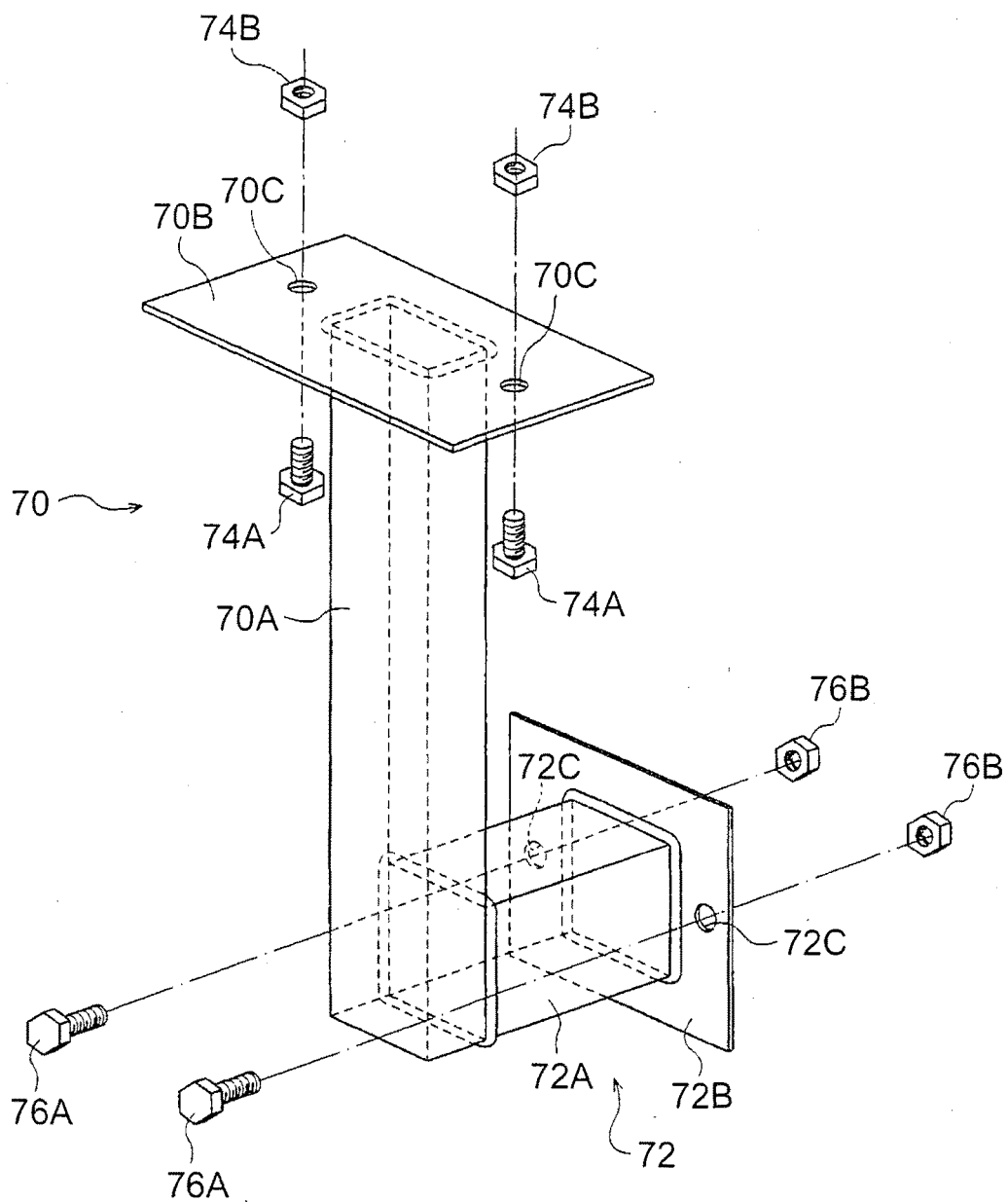
FIG. 5 is a perspective view illustrating an essential part of a modification of the second embodiment of the present invention.

Next will be described a modification of the second embodiment with reference to FIG. 5 as well as FIG. 4. FIG. 5 is a perspective view of an essential part of the modification of the second embodiment, more specifically, a constituent provided instead of the vertical member 62 (see FIG. 4) and the connecting support member 64 (see FIG. 4) in the second embodiment. The other configuration in the modification of the second embodiment is the same as in the second embodiment.

A vertical member 70 illustrated in FIG. 5 is a member provided instead of the vertical member 62 (see FIG. 4) in the second embodiment, and a connecting support member 72 as the second connecting member is a member provided instead of the connecting support member 64 (see FIG. 4) in the second embodiment.

The vertical member 70 illustrated in FIG. 5 is connected to a bottom face of a connecting portion 46 between an outrigger 40 and an apron upper member 36 as illustrated in FIG. 4, the vertical member 70 extends from the bottom face of a connecting portion 46 between an outrigger 40 and an apron upper member 36. The vertical member 70 illustrated in FIG. 5 includes a squarely cylindrical body portion 70A placed with the vehicle up and down direction as its longitudinal direction. Note that the body portion 70A of the vertical member 70 may be formed in a rectangular column shape, or may be formed in a cylindrical shape. The body portion 70A of the vertical member 70 is made of metal, and an outer surface of the body portion 70A faces the vehicle width direction and the vehicle front-rear direction. A lower end part of the body portion 70A is set in a position at a height equivalent to that of a front side member 20 (see FIG. 4).

Further, the vertical member 70 includes a flat-plate cover plate portion 70B configured such that an upper end of the body portion 70A abuts therewith so as to be connected thereto. In the present embodiment, the cover plate portion 70B is made of sheet metal, and a whole circumference of the upper end of the body portion 70A is welded (arc-welded, in the present embodiment) to a bottom face of the cover plate portion 70B. Bolt insertion holes 70C are formed in a front part and a rear part of the cover plate portion 70B so as to penetrate therethrough. Screw shanks of bolts 74A penetrating through the bolt insertion holes 70C from below in the vehicle up and down direction penetrate through an apron front 32 as illustrated in FIG. 4, and at least one of an outrigger 40 and an apron upper member 36, so as to be engaged with weld nuts 74B illustrated in FIG. 5.

In the meantime, one end of a squarely cylindrical body portion 72A in the connecting support member 72 abuts with an inner surface, in the vehicle width direction, of a lower end part of the body portion 70A of the vertical member 70, so as to be connected thereto. In the present embodiment, the body portion 72A of the connecting support member 72 is made of metal, and a whole circumference of one end of the body portion 72A of the connecting support member 72 is welded (arc-welded, in the present embodiment) to a bottom side face of the body portion 70A of the vertical member 70. Note that the body portion 72A of the connecting support member 72 may be formed in a rectangular column shape. The body portion 72A of the connecting support member 72 extends horizontally to be directed inward in the vehicle width direction.

Further, the connecting support member 72 includes a flat-plate cover plate portion 72B configured such that the other end of the body portion 72A abuts therewith so as to be connected thereto. In the present embodiment, the cover plate portion 72B is made of sheet metal, and a whole circumference of the other end of the body portion 72A is welded (arc-welded, in the present embodiment) to an outer face, in the vehicle width direction, of the cover plate portion 72B. The cover plate portion 72B of the connecting support member 72 abuts with an outer surface, in the vehicle width direction, of a front side member outer 24 in the front side member 20 as illustrated in FIG. 4. As illustrated in FIG. 5, bolt insertion holes 72C are formed in a front part and a rear part of the cover plate portion 72B so as to penetrate therethrough. Screw shanks of bolts 76A penetrating through the bolt insertion holes 72C from outside in the vehicle width direction penetrate through the front side member outer 24 as illustrated in FIG. 4, so as to be engaged with weld nuts 76B illustrated in FIG. 5. Hereby, the connecting support member 72 is connected to the front side member 20 (see FIG. 4).

Further, a connecting portion between the front side member 20 (see FIG. 4) and the connecting support member 72 is placed on the vehicle rear side relative to a connecting portion 54 between the front side member 20 and a gusset 50 so as to be separated therefrom.

Even with the configuration, the same operations and effects as in the second embodiment described above are obtained.

Supplementary Description of Embodiments

Note that, as a modification of the embodiments, the bracket 26 illustrated in FIG. 3 may not be provided, and the fixed portion 44A of the outrigger 40 as the first connecting member may directly make contact with the front flange 22F of the front side member inner 22 so as to be fixed thereto in a fastening manner. Further, as a modification of the embodiments, the gusset (50) may be placed between the front part (40F) of the outrigger (40) as the first connecting member and the front end part of the front side member (20), the front part (40F) of the outrigger (40) may be fixed to the gusset (50), and the gusset (50) may be fixed to the front end part of the front side member (20). That is, the front part of the first connecting member may be connected to the front side member via the gusset. Note that, in this case, the front end part of the gusset may be connected to a front end panel or the like, for example.

Further, the connecting support member (52, 64, 72) as the second connecting member may be connected to the connecting portion (46) between the outrigger (40) as the first connecting member and the apron upper member (36) without providing the apron front (32) therebetween. Further, as another modification, the connecting support member (52, 64, 72) as the second connecting member may be connected, directly or via a member (the vertical member 62, 70), to the rear part (e.g., that area of the rear part which is adjacent to the connecting portion (46)) of the outrigger (40) as the first connecting member except the connecting portion (46). Alternatively, the connecting support member (52, 64, 72) as the second connecting member may be connected, directly or via a member (the vertical member 62, 70), to the front part (e.g., that area of the front part which is adjacent to the connecting portion (46)) of the apron upper member (36) except the connecting portion (46). Further, the connecting support member (52, 64, 72) may be connected to the rear part of the outrigger (40) and the front part of the apron upper member (36) directly or via a member (the vertical member 62, 70) so as to connect the rear part of the outrigger (40) to the front part of the apron upper member (36).

Further, as a modification of the embodiments, the vertical member (62, 70) may be connected to the rear part of the outrigger (40) except the connecting portion (46), the vertical member (62, 70) may extends from the rear part of the outrigger (40) except the connecting portion (46), or may be connected to the front part of the apron upper member (36) except the connecting portion (46), the vertical member (62, 70) may extends from the front part of the apron upper member (36) except the connecting portion (46). Further, the vertical member (62, 70) may be connected to the rear part of the outrigger (40) and the front part of the apron upper member (36) so as to connect the rear part of the outrigger (40) to the front part of the apron upper member (36).

Further, as a modification of the embodiments, an inner end, in the vehicle width direction, of the second connecting member may be connected, by welding, bolt fastening, or the like, to a top face part of the front side member (20). Further, an outer end, in the vehicle width direction, of the second connecting member may be connected, by welding, bolt fastening, or the like, to an inner longitudinal wall portion, in the vehicle width direction, of the apron upper member (36).

Further, in the above embodiments, the gusset 50 is provided, and such a configuration is preferable. However, a configuration in which the gusset (50) is not provided can be adopted.

Further, as a modification of the embodiments, the connecting portion (56, 66) between the front side member (20) and the connecting support member (52, 64, 72) as the second connecting member may be provided on the vehicle rear side relative to the connecting portion (54) between the front side member (20) and the gusset (50) so as not to be separated therefrom. Further, a triangular closed space (a high-strength constituting portion) may be formed by the outrigger (40) as the first connecting member, the gusset (50), and the connecting support member (52) as the second connecting member. In a structure in which such a triangular closed space (the high-strength constituting portion) is formed, when a collision load is input into the outrigger (40) provided outside the front side member (20) in the vehicle width direction (at the time of a small overlap collision or the like in which no load is input into the crash box (18)), it is possible to effectively transmit the load from the outrigger (40) to the front side member (20) via the connecting support member (52).

Further, a concept of "extending inward in a vehicle width direction in a plan view of a vehicle" includes the following cases: a case of extending inward in the vehicle width direction along a direction parallel to the vehicle width direction in the plan view of the vehicle, as described in the above embodiments; and a case of extending inward in the vehicle width direction along a direction slightly inclined relative to the vehicle width direction in the plan view of the vehicle, and yielding substantially the same operations and effects as the case of extending inward in the vehicle width direction along the direction parallel to the vehicle width direction in the plan view of the vehicle.

Note that the above embodiments and the plurality of modifications described above can be combined appropriately to perform the present invention.

Embodiments of the present invention have been described above, but the present invention is not limited to the above and may be modified in various ways to be performed as long as the modifications are not beyond the gist thereof.

The invention claimed is:

1. A vehicle front structure comprising:
    a front side member provided on an outer side of a vehicle-body front portion in a vehicle width direction, the front side member being placed along a vehicle front-rear direction;
    an apron upper member provided outside the front side member in the vehicle width direction and above the front side member in a vehicle up and down direction, the apron upper member being placed along the vehicle front-rear direction;
    a first connecting member connected to a front end part of the apron upper member, the first connecting member extending from a first connecting portion between the first connecting member and the front end part of the apron upper member, up to that area of the front side member, the area of the front side member being on a front end side of the front side member and the area of the front side member being on an outer side of the front side member in the vehicle width direction, the first connecting member being connected to the front side member directly or via a first intermediate member; and
    a second connecting member connected, directly or via a second intermediate member, to an area between a rear part of the first connecting member and the front part of the apron upper member, the second connecting member extending from a connecting section of the second connecting member to inward in the vehicle width direction in a plan view of a vehicle, the second connecting member being connected to the front side member.

2. The vehicle front structure according to claim 1, wherein:
    the second connecting member is connected, directly or via the second intermediate member, to the first connecting portion between the first connecting member and the apron upper member.

3. The vehicle front structure according to claim 1, wherein:
    the second connecting member is inclined downward in the vehicle up and down direction, the second connecting member extending inward in the vehicle width direction.

4. The vehicle front structure according to claim 1, wherein:
    a vertical member is provided, the vertical member being connected to the area between the rear part of the first connecting member and the front part of the apron upper member, the vertical member extending from the area between the rear part of the first connecting member and the front part of the apron upper member; and
    the second connecting member is connected to a lower end part of the vertical member, the second connecting member extending horizontally to be directed inward in the vehicle width direction, the second connecting member being connected to an outer surface of the front side member in the vehicle width direction.

5. The vehicle front structure according to claim 1, wherein:
    a gusset is placed on the front end side of the front side member and on the outer side of the front side member in the vehicle width direction; and
    the gusset is connected to the front side member and the first connecting member.

6. The vehicle front structure according to claim 5, wherein:
    a second connecting portion between the front side member and the second connecting member is placed on a vehicle rear side relative to a third connecting portion between the front side member and the gusset, the second connecting portion between the front side member and the second connecting member being separated from the third connecting portion between the front side member and the gusset.

* * * * *